United States Patent
Yushiya

(10) Patent No.: US 6,865,000 B2
(45) Date of Patent: *Mar. 8, 2005

(54) IMAGE READING APPARATUS FOR GROUPING SENSORS ACCORDING TO CHARACTERISTICS

(75) Inventor: Akihiko Yushiya, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/567,077

(22) Filed: Dec. 4, 1995

(65) Prior Publication Data

US 2002/0048055 A1 Apr. 25, 2002

(30) Foreign Application Priority Data

Dec. 6, 1994 (JP) .............................................. 6-302077
Feb. 20, 1995 (JP) .............................................. 7-030756

(51) Int. Cl.$^7$ ................................................. G03F 3/08
(52) U.S. Cl. ....................... 358/518; 358/504; 358/505; 358/512; 358/514
(58) Field of Search ............................... 358/504, 505, 358/512, 514, 518, 513, 482, 483, 454, 474, 494; 250/208.1, 226; 348/340

(56) References Cited

U.S. PATENT DOCUMENTS

| 4,558,357 | A | * | 12/1985 | Nakagawa et al. ......... 358/514 |
| 4,763,189 | A | * | 8/1988 | Komatsu et al. ............ 358/514 |
| 4,855,817 | A | | 8/1989 | Watanabe |
| 4,870,483 | A | * | 9/1989 | Nishigaki et al. ........... 358/512 |
| 5,003,380 | A | * | 3/1991 | Hirota ........................ 358/514 |
| 5,329,149 | A | * | 7/1994 | Kawahara et al. .......... 257/435 |
| 5,416,611 | A | * | 5/1995 | Tandon ....................... 358/474 |
| 5,428,463 | A | * | 6/1995 | Goto ........................... 358/482 |
| 5,452,001 | A | * | 9/1995 | Hosier et al. ............... 348/230 |
| 5,477,345 | A | * | 12/1995 | Tse ............................. 358/513 |
| 5,587,814 | A | * | 12/1996 | Mihara et al. .............. 358/514 |

* cited by examiner

Primary Examiner—Mark Wallerson
(74) Attorney, Agent, or Firm—Morgan & Finnegan, LLP

(57) ABSTRACT

There is disclosed an image pickup device comprising plural picture elements, each including plural pixels arranged in the longitudinal direction of the image sensor, wherein the picture elements are so arranged that the separating area between the picture elements has a width larger than the distance between the centers of the pixels mutually adjacent within the picture element. Such arrangement enables high-quality image taking without generation of colored moiree fringes or false colors.

23 Claims, 13 Drawing Sheets

IMAGE READING APPARATUS FOR GROUPING SENSORS ACCORDING TO CHARACTERISTICS

BACKGROUND OF THE INVENTION

1. Field of the Invention

The present invention relates to an image pickup device for picking up the image of an object and converting it into an image signal.

2. Related Background Art

As an image sensor for reading an original document, there is already known a contact multi-chip image sensor, composed of a light source, a short-focus imaging element array and plural line sensors. FIGS. 1 to 4 illustrate an example of such image pickup device. Referring to FIG. 1, at the upper end of a frame 200, there is provided a transparent glass plate 201 capable of contacting an original document. Illuminating light 212, emitted from a light source 210 provided in the frame 200, illuminates the surface of the original document contacting the upper face of the transparent glass plate 201. The light 213 reflected from the original is transmitted through an optical system 209 and an infrared cut-off filter 211 and is focused on a sensor array 1 provided on a substrate 19, corresponding to the optical system 209.

The above-mentioned optical system is composed, for example, of an array of imaging elements of a short focal length, such as Selfoc lens array (trade name of Japan Plate Glass Co., Ltd.). Also the above-mentioned light source is composed of a xenon tube or a cold cathode tube.

The sensor array 1 is constructed in the following manner. As shown in FIG. 2, the sensor array 1 is composed of a linear array of plural sensor chips 2, 2', 2", . . . on the substrate 19, and is covered by a protective film 206. The substrate 19 is supported by a bottom plate 205 engaging with the frame 200 as shown in FIG. 1, and is connected to a flexible circuit board 203 through a flexible cable 208. The flexible board 203 is provided thereon with a connector 202 for the input/output of power supply and control signals, and the connector 202 is mounted, as shown in FIG. 3, on the frame 200 with screws 207.

FIG. 4 shows the pixel arrangement in the vicinity of joints of the plural sensor chips 2, 2', 2", . . . arranged linearly on the substrate 19 constituting the sensor array 1. R, G and B pixels 3, 4, 5, respectively covered by R, G and B color filters are arranged in succession, with element isolation areas 6 therebetween, and these pixels release mutually independent signals. In the signal processing, the consecutive R, G and B pixels are regarded to constitute a picture element, and the output signals of the R, G, B pixels are regarded as R, G, B components of the picture element. Such arrangement enables image reading with a high resolution.

In the following there will be briefly explained the color reproduction of a color original, utilizing the contact multi-chip color image sensor of the above-explained configuration. FIG. 5 shows a CIE-xy chromaticity diagram, in which an area surrounded by a solid line, consisting of a spectrum line and a red-purple line, includes all the colors. FIG. 6 shows the spectral sensitivity distribution of the R, G and B sensor in the contact multi-chip color image sensor, FIG. 13 shows spectral emission characteristics of an Xe tube, FIG. 14 shows spectral transmission characteristics of an infrared cut-off filter and the chromaticity coordinates R, G, B of the sensors can be determined from FIGS. 6, 13 and 14. An area inside a broken-lined triangle, having the corner points at the chromaticity ordinates R, G, B, indicates the color reproduction area of the contact multi-chip color image sensor.

If R, G, B signals r, g, b are obtained in a picture element by reading an original document, the color of the original is represented by the coordinate of the center of gravity when the r, g, b values are respectively placed at the points R, G, B in FIG. 5. As an example, if the original document is the white reference, there stands a relation r=g=b, so that the color of the white reference is represented by the coordinate of the center of gravity of the triangle RGB, representing the color reproducible area of the contact multi-chip color image sensor. Similarly the colors of the picture elements present in the original can be determined and the color reproduction can be achieved with R, G, B colors.

In the following there will be explained the method of representing the resolution of an image. There are known various methods for representing the resolution, but, in the following, explained is a method utilizing MTF. By reading a grid pattern as shown in FIG. 7 with an image sensor, there is obtained an output signal as shown in FIG. 8. The modulation transfer function (MTF) can be obtained by substituting the maximum value $i_{max}$ and the minimum value $i_{min}$ of such output signal into the following equation:

$$MTF=(i_{max}-i_{min})/(i_{max}+i_{min})\times100(\%)$$

As the MTF of the sensor chip is generally sufficiently high, the MTF of the Selfoc lens array (SLA) used in the optical system is directly reflected in the MTF of the image sensor. FIG. 9 shows an example of the spatial frequency characteristics of such MTF.

For example, in case of an image sensor with a resolution of 400 DPI and with a conventional pixel arrangement as shown in FIG. 4, the pitch of the picture elements is equal to about 63.5 μm, while the distance between the pixels R and G or G and B constituting a picture element is about 21.2 μm, and that between the pixels R and B is about 42.3 μm. With such distances among the pixels, the optical system 209 has a resolution of about 8 lp/mm between the picture elements, 24 lp/mm between the pixels R and G or G and B, and 12 lp/mm between the pixels R and B. According to FIG. 9, the MTF of the optical system is sufficiently low, about 0%, for a distance between the pixels R and G or G and B, but is about 30% at a distance between the pixels R and B, corresponding to a considerable resolving power which is no longer negligible in comparison with the MTF of 50% between the picture elements. Thus, if the optical system resolves the image light among the pixels constituting the picture element, there tend to be generated colored moiree fringes because of the difference in the optical positions, and there is provided a very unpleasant image particularly in case of a monochromatic image because of generation of false colors at the edge portion between black and white areas.

Such false color generation may be suppressed by reducing such colored moiree fringes for example through a signal processing so as to align the reading positions of the R, G, B pixels utilizing the outputs of the mutually adjacent pixels of a same color, but such method results in an increase in the circuit magnitude, because of the necessity for a memory for correcting the reading position, thus leading to an increased cost. Also the correction by such circuit alone cannot completely avoid the generation of such colored moiree fringes or false colors.

Also in case the sensor array is constituted by plural sensor chips, the spectral sensitivity characteristics may be different among such sensor chips, and the color space, constituting the basis of color reproduction, also becomes different among such sensor chips. For this reason, there may result an unnatural step difference in color, in the original image reading at the junction between the sensor chips. Particularly in case of an original which has a uniform color area over several sensor chips, there is reproduced a very unpleasant image with conspicuous streaks of color step difference.

SUMMARY OF THE INVENTION

An object of the present invention is to provide an image pickup device capable of image taking of high quality.

Another object of the present invention is to provide an image pickup device with an improved sensitivity.

Still another object of the present invention is to provide an image pickup device free from generation of colored moiree fringes, false colors or color step difference.

The above-mentioned objects can be attained, according to an embodiment of the present invention, by an image pickup device provided with an image sensor for converting the image light from an object into an electrical signal, wherein the image sensor comprises plural picture elements, each including plural pixels arranged in the longitudinal direction of the sensor, in which the picture elements are so arranged that a separating area between the picture element has a width larger than the distance between the pixels adjacent within the picture element and the MTF for a distance between any two pixels that constitutes one picture element is sufficiently low.

Also according to another embodiment of the present invention, there is provided an image pickup device provided with an array of plural image sensors, each consisting of plural sensors for different colors, wherein the image sensors, showing largest relative difference in the spectral sensitivity characteristics in sensors of at least a color, are not placed in mutually adjacent positions.

According to still another embodiment, there is provided an image pickup device provided with an array of plural image sensors of mutually different spectral sensitivity characteristics, wherein, among the plural image sensors, image sensors with largest different in the spectral sensitivity characteristics are not placed in mutually adjacent positions.

It is thus rendered possible to provide an image pickup device capable of image taking of high quality, also to provide an image pickup device of an improved sensitivity, and to provide an image pickup device free from generation of colored moiree fringes, false colors and color step difference.

Still other objects of the present invention, and the features thereof, will become fully apparent from the following description, which is to be taken in conjunction with the attached drawings.

DESCRIPTION OF THE PREFERRED EMBODIMENTS

Figure 10:
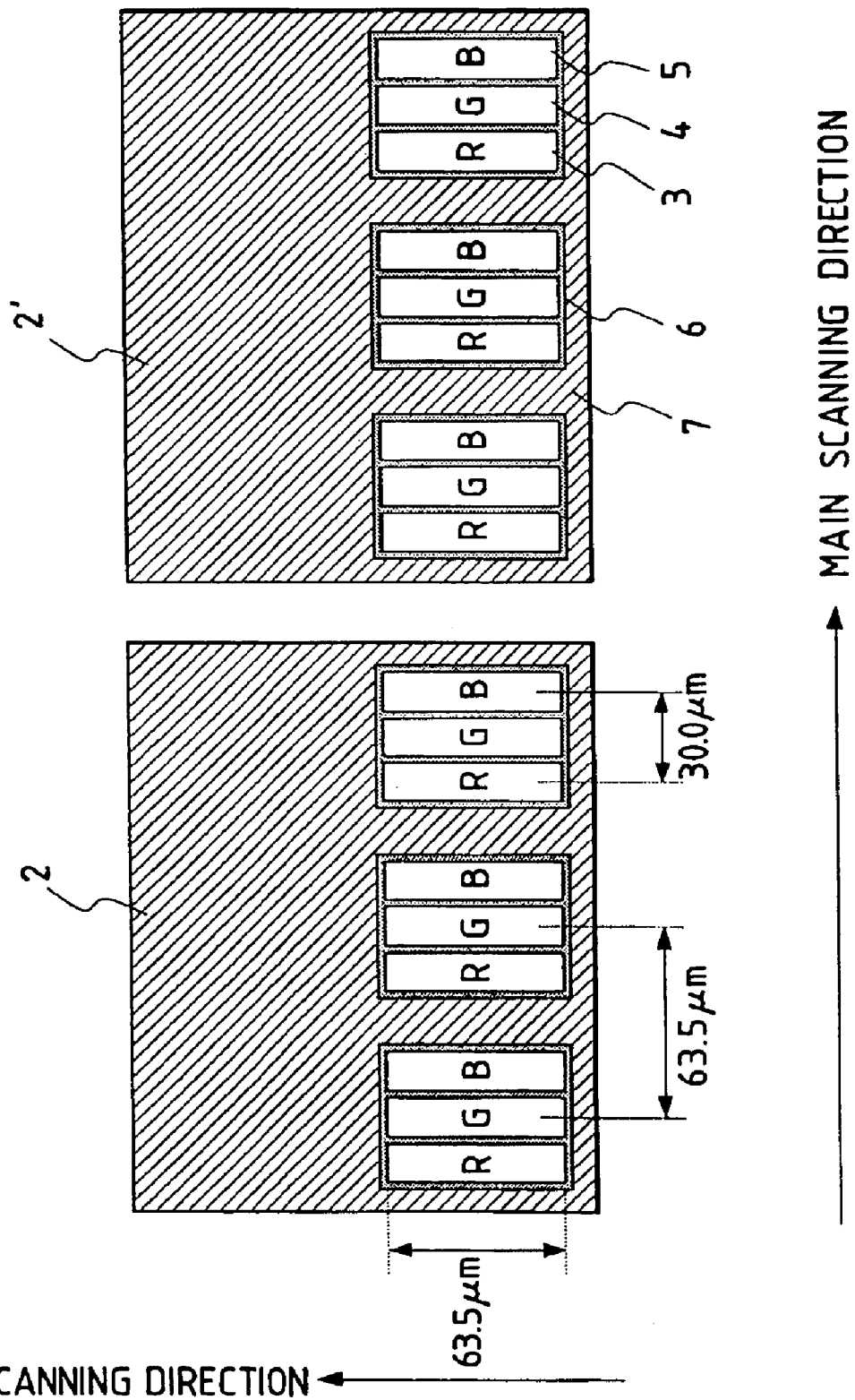
FIG. 10 is a view showing the pixel arrangement in sensor chips in a first embodiment.

FIG. 10 is a view showing the configuration of an image sensor constituting a first embodiment of the present invention. The image sensor of the present embodiment is a multi-chip image sensor in which a sensor array is composed of plural sensor chips wherein three pixels (R, G and B) constituting a picture element are arranged in the main scanning direction, which is the longitudinal direction of the image sensor, and a pixel separating area (light shielding area) is provided between the picture elements.

Figure 1:
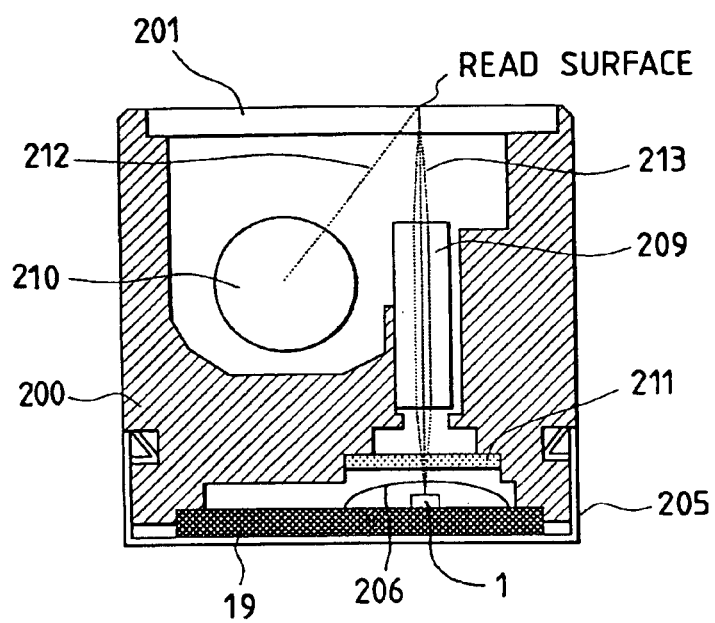
FIG. 1 is a cross-sectional view of a contact multi-chip image sensor utilizing Xe tube as a light source.
Figure 2:
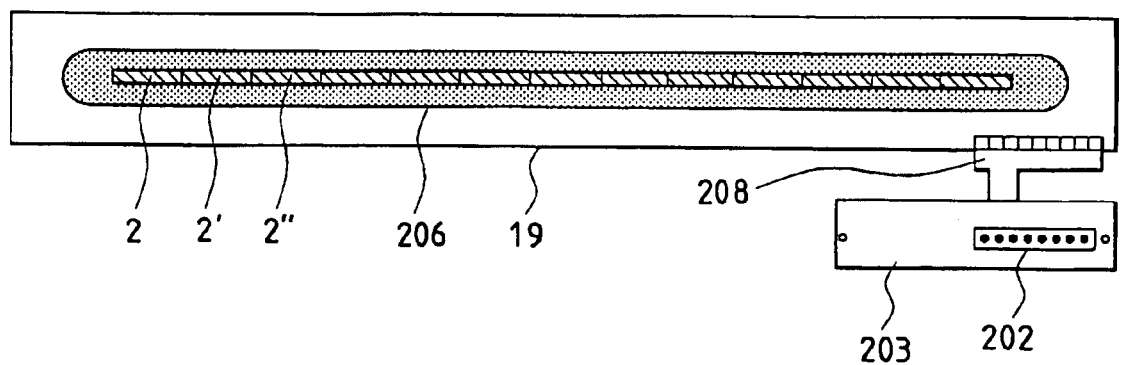
FIG. 2 is a plan view of a sensor array.
Figure 3:
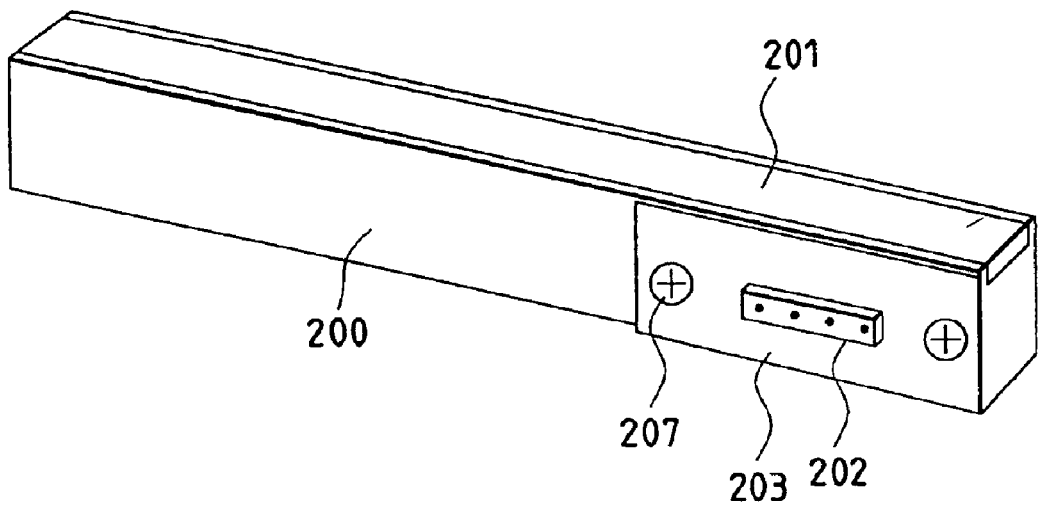
FIG. 3 is an external perspective view of a contact multi-chip image sensor.

The basic structure of the image pickup device is same, also in case of the image sensor of the present embodiment, as that shown in FIG. 1 and will not, therefore, be explained further.

Figure 9:
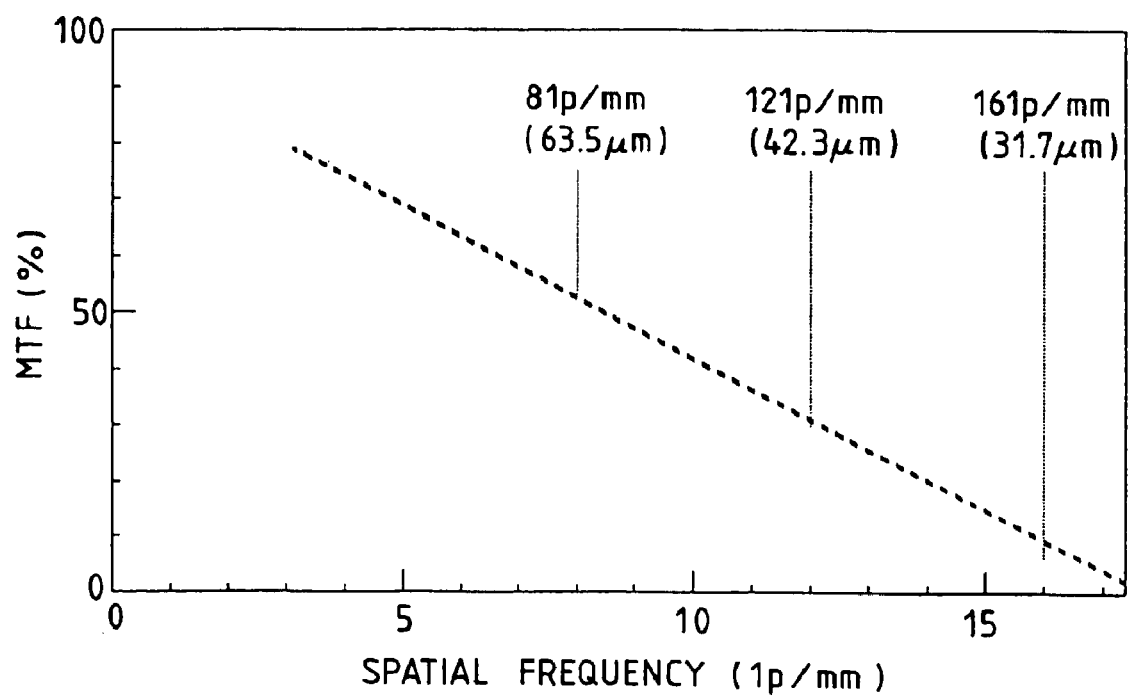
FIG. 9 is a chart showing an example of MTF characteristics.

In the image sensor shown in FIG. 10, the pitch between the centers of the mutually adjacent picture elements is about 63.5 µm, but, because of the presence of a light shielding area 7 between the picture elements, the pitch of the pixels R and G or G and B within a picture element is about 15.0 µm and that of the pixels R and B is about 30.0 µm. With such positional arrangement, the optical system 209 has a resolution of 8 lp/mm between the picture elements, 32 lp/mm between the pixels R-G or G-B and 16 lp/mm between the pixels R-B. Thus, according to FIG. 9, the MTF value is about 50% between the picture elements, about 0% between the pixels R-G or G-B and about 10% between the pixels R-B.

As explained in the foregoing, in the image sensor, it is desired that the MTF characteristics of the optical system have a high resolution among the picture elements and a low resolution between the pixels R-G, G-B or R-B constituting a picture element. The pixel arrangement of the present embodiment allows to reduce the resolution between the pixels R-G, G-B or R-B constituting a picture element, while maintaining the resolution between the picture elements, thereby optically reducing the colored moiree fringes and providing an image of high quality without the addition of a particular signal processing circuit.

Also the pixel arrangement of the present embodiment can resolve the moiree fringes, resulting from the joint of the sensor chips, in addition to the suppression of the resolution among the R, G, B pixels within each picture element. Besides the reading sensitivity can be improved as the area of aperture within each picture element can be increased.

As explained in the foregoing, the image pickup device of the present embodiment is provided with an image sensor for receiving the light from an object and converting the light into an electrical signal, and an optical system for focusing the image light from the object onto the image sensor, wherein, in the image sensor, plural pixels for different colors are arranged along the main scanning direction to constitute a picture element and a pixel separating area is provided between the adjacent picture elements, in which the picture elements are arranged with a pitch resolvable by the optical system while the pixels constituting each picture element are arranged with such a pitch that lowers the resolution by the optical system. Such configuration enables to optically prevent the colored moiree fringes, thus avoiding generation of unpleasant false colors for example at the edge portions of a black-and-white image. It is also rendered possible to achieve high-quality image reading with the image sensor, without increase in the circuit magnitude or in the memory capacity. It is furthermore rendered possible to achieve image taking of high quality, without increase in cost, by the image pickup device utilizing such image sensor.

The image sensor of the present embodiment is composed of R, G and B pixels, but it may also be composed of pixels of other colors, for example yellow, magenta and cyan.

Also the order of arrangement of these colors is not limited to the example of the present embodiment.

Figure 5:
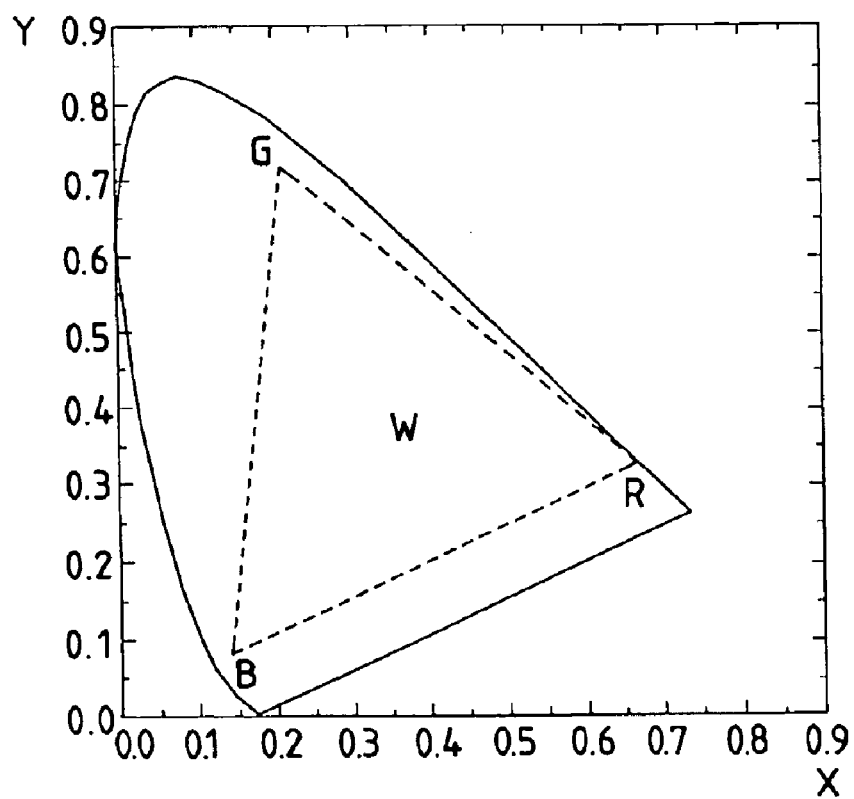
FIG. 5 is an x-y chromaticity diagram of a sensor.
Figure 4:
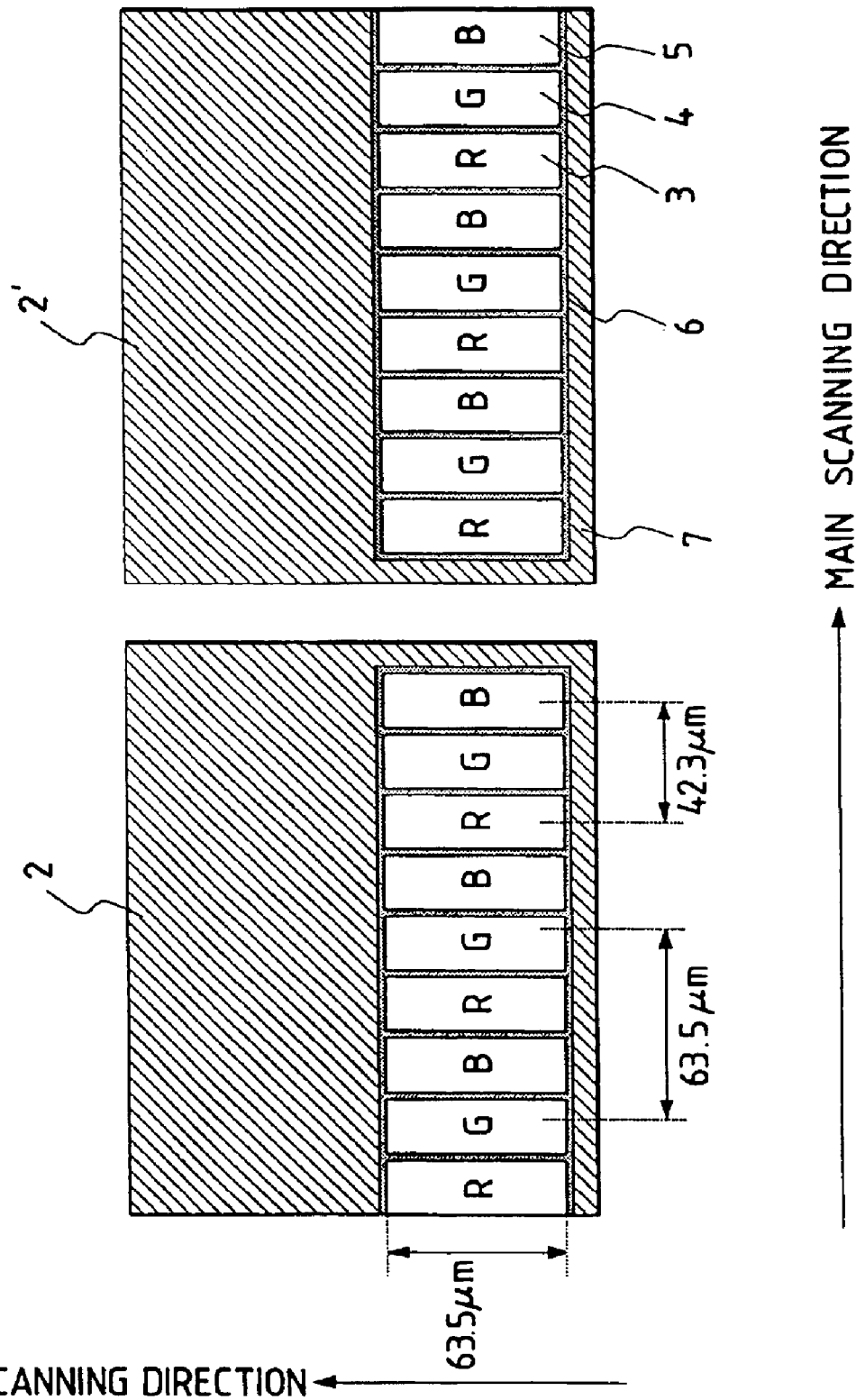
FIG. 4 is a view showing the arrangement of pixels in a conventional sensor chip.
Figure 6:
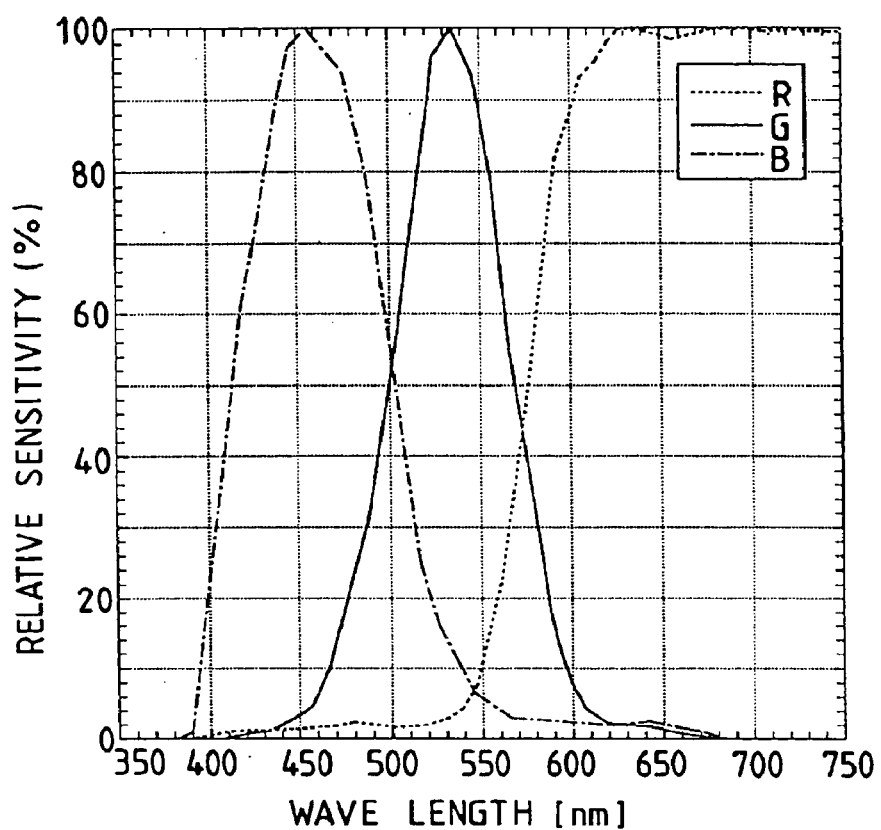
FIG. 6 is a chart showing spectral sensitivity characteristics of R, G, B sensors.
Figure 7:
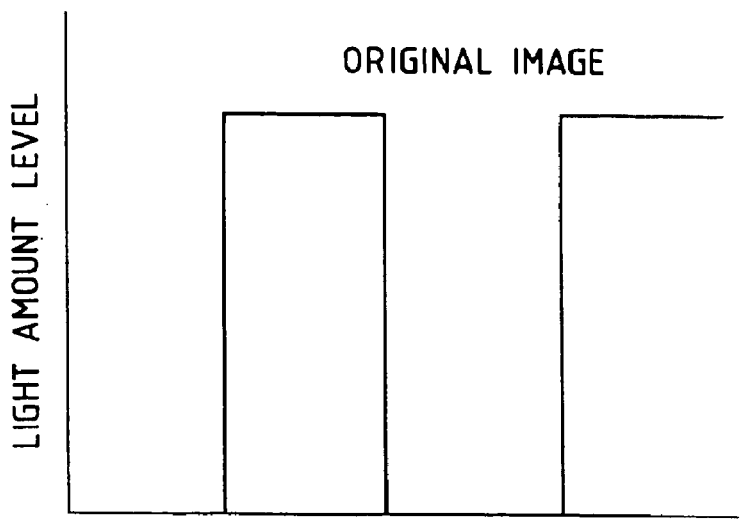
FIG. 7 is a chart showing a grid pattern for MTF measurement.
Figure 8:
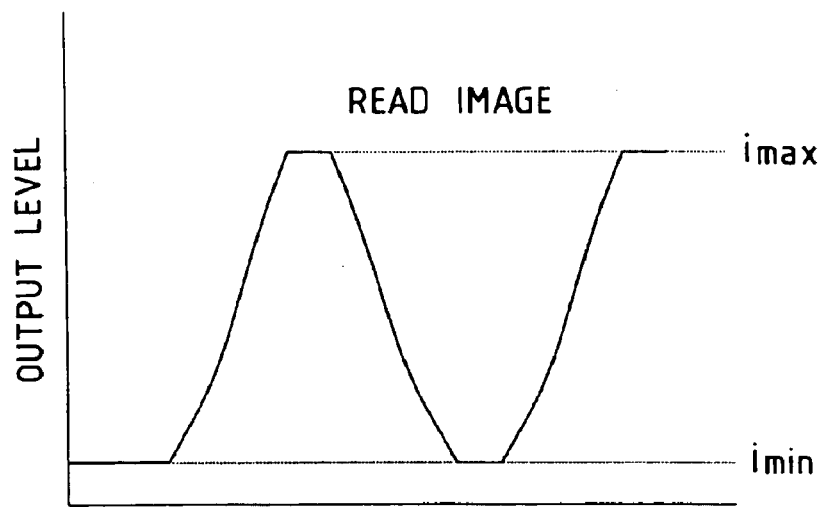
FIG. 8 is a chart showing the output signal wave form of an image sensor at the MTF measurement.
Figure 11:
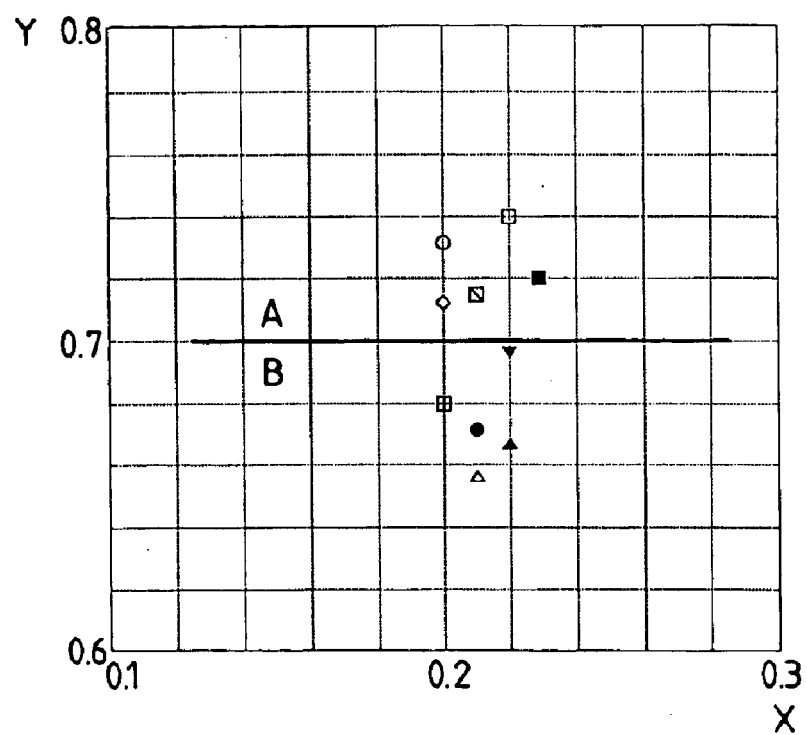
FIG. 11 is an x-y chromaticity diagram of green sensors in a second embodiment.

FIG. 11 is a CIE-xy chromaticity diagram, similar to FIG. 5, showing the grouped spectral sensitivity characteristics of sensor chips in a second embodiment. In FIG. 11, each plot represents the x-y chromaticity of G sensors of 10 chips. In the contact multi-chip color image sensor of the present embodiment, the x-y chromaticity of the G sensor can be determined from the following calculation. From the spectral characteristics of the constituents, the tristimulus values Xg, Yg, Zg of the G sensor in the CIE 1931 standard colorimetric system are given by:

$$Xg=K\int Xe(\lambda)IR(\lambda)SG(\lambda)x(\lambda)d\lambda$$

$$Yg=K\int Xe(\lambda)IR(\lambda)SG(\lambda)y(\lambda)d\lambda$$

$$Zg=K\int Xe(\lambda)IR(\lambda)SG(\lambda)z(\lambda)d\lambda$$

$$K=100/\int Xe(\lambda)IR(\lambda)y(\lambda)d\lambda$$

wherein

Xe ($\lambda$): spectral emission characteristics of a Xe tube;

IR ($\lambda$): spectral transmission characteristics of an infrared cut-off filter;

SG ($\lambda$): spectral sensitivity characteristics of a single G sensor;

x, y, z ($\lambda$): color matching functions.

Figure 12:
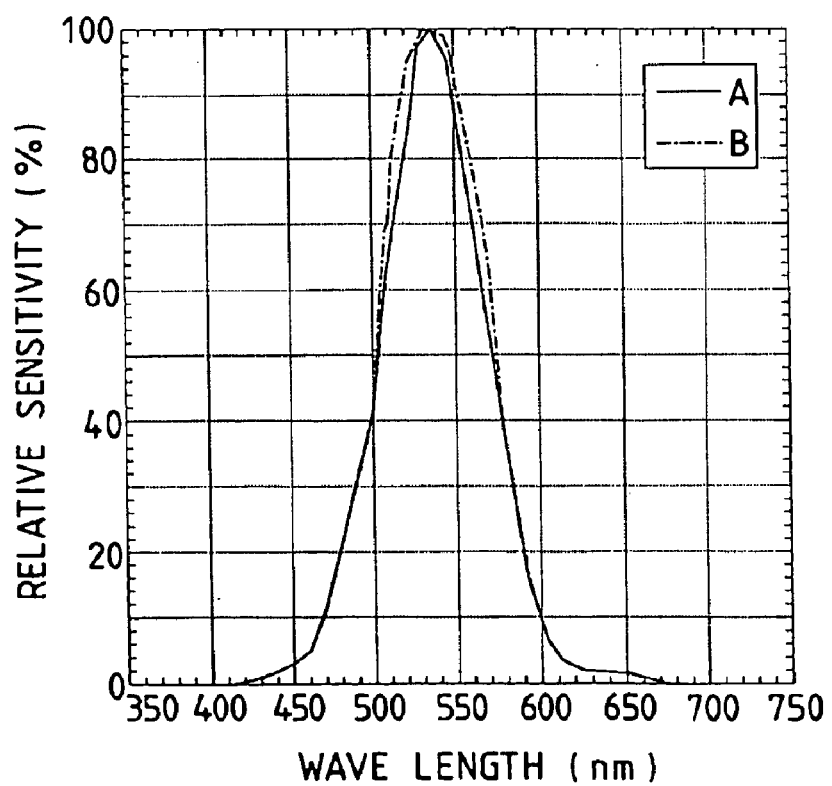
FIG. 12 is a chart showing the spectral sensitivity characteristics of green sensors in the second embodiment.
Figure 13:
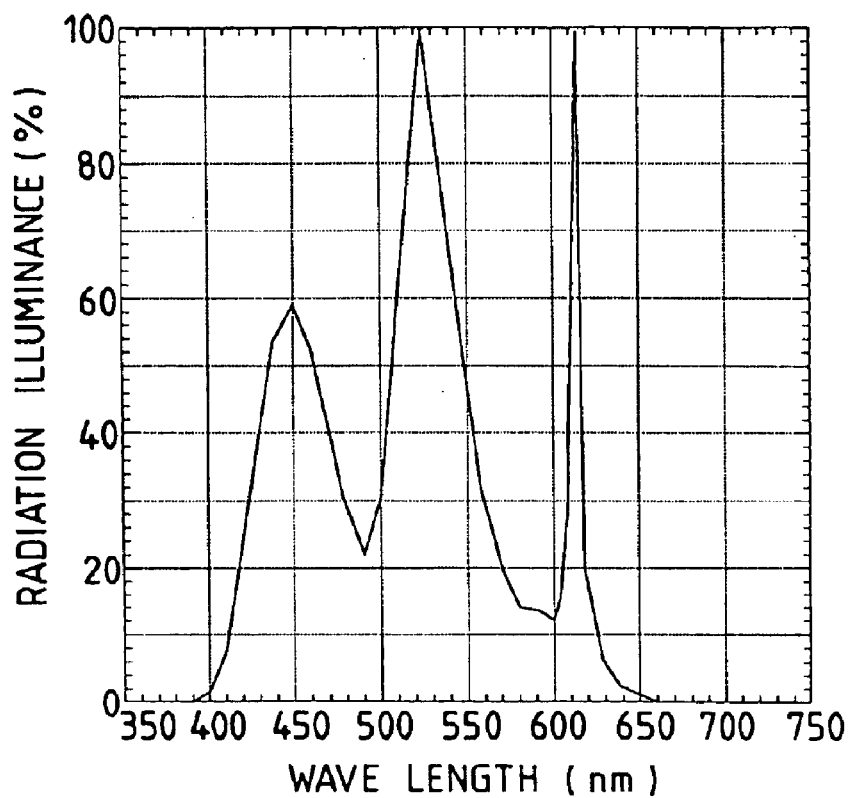
FIG. 13 is a chart showing the spectral emission characteristics of an Xe tube in the second embodiment.
Figure 14:
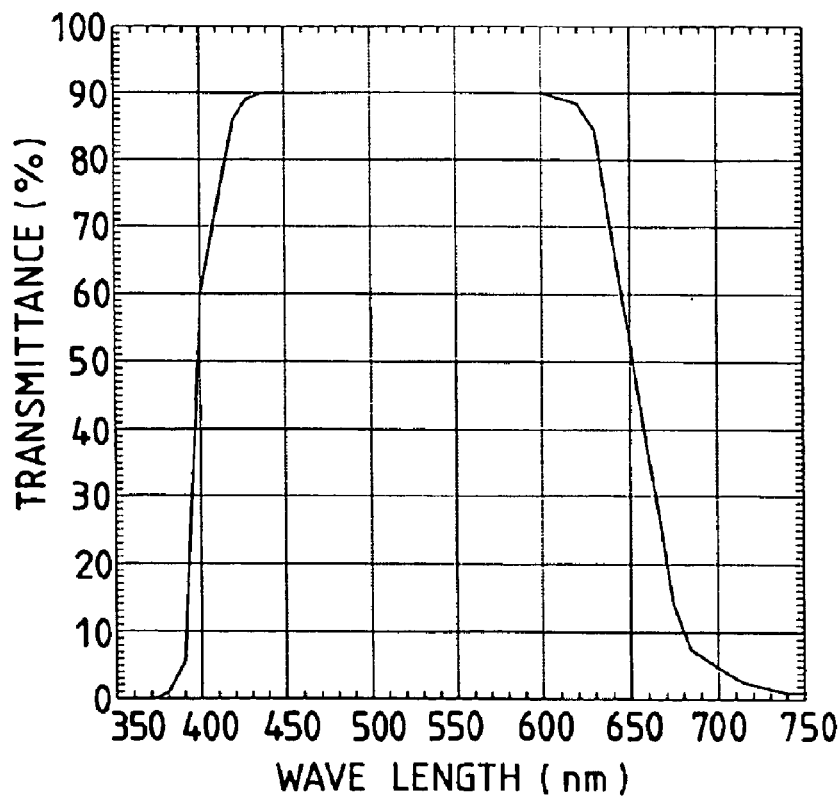
FIG. 14 is a chart showing the spectral transmission characteristics of an infrared cut-off filter in the second embodiment.

SG ($\lambda$), Xe ($\lambda$) and IR ($\lambda$) have characteristics as respectively shown in FIGS. 12 to 14. Also the tristimulus values Xr, Yr, Zr of the R sensor and those Xb, Yb, Zb of the B sensor can be similarly determined by replacing, in the foregoing equations, the spectral sensitivity characteristics SG ($\lambda$) of the single G sensor with that SR ($\lambda$) of the single R sensor and with that SB ($\lambda$) of the single B sensor.

The CIE-xy chromaticity coordinates of the G sensor can be determined by substituting the tristimulus values Xg, Yg, Zg, obtained from the foregoing equations, into following equations:

$$xg=Xg/(Xg+Yg+Zg)$$

$$yg=Yg/(Xg+Yg+Zg)$$

The xy chromaticity coordinates xr, yr of the R sensor and those xb, yb of the B sensor can also be determined in a similar manner.

The sensor chips are classified, for example, into two groups A and B, according to thus determined xy chromaticity of G sensor as shown in FIG. 11. The difference in chromaticity of the G sensors arises only from the difference in the spectral sensitivity characteristics of each G sensor, since other components are common in a contact multi-chip color image sensor.

Figure 15:
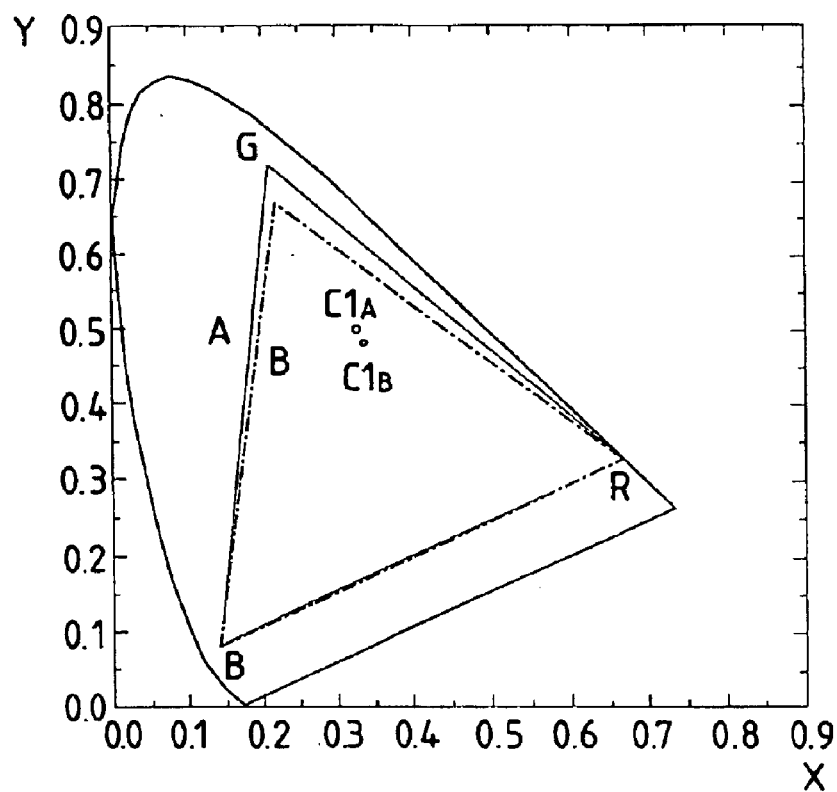
FIG. 15 is an x-y chromaticity diagram of sensor chips in the second embodiment.

For the simplicity of explanation, let us assume that the R or B sensors have the identical chromaticity characteristics. In such case, the G sensors of chips, respectively selected from the groups A and B, will show color spaces as shown in FIG. 15 as an example. Consequently, if the sensor array is constructed without such grouping, the sensor chips having both color spaces A, B may be mixedly present within a sensor array.

As a result, a picture element of a chromaticity C1 will be reproduced differently as C1A and C1B, respectively by the sensor chips of the color spaces A and B, though there exists only one original color. As the picture elements within a sensor chip provide relatively uniform chromaticity in reproduction, the difference in the chromaticity characteristics between the sensor chips appears as a color step difference on the reproduced image.

Therefore, by constituting the sensor array from the sensor chips belonging only to a group, such sensor chips have relatively similar color spaces, so that it is made possible to reduce the difference in color characteristics among the sensor chips and to reduce the color step difference.

In practice, however, it is not enough to classify the sensor chips according to the chromaticity characteristics of the G sensors only, because the spectral sensitivity characteristics of the sensor chips show fluctuation not only in the G sensors but also in the R and B sensors. For this reason, in the present embodiment, the grouping is also conducted for the R and B sensors by calculating the xy chromaticity coordinates thereof, as in the case of G sensors, and each sensor array is constituted by the sensor chips which belong to a same group of classification for three colors, whereby the color spaces of the sensor chips are made mutually close.

Figure 16:
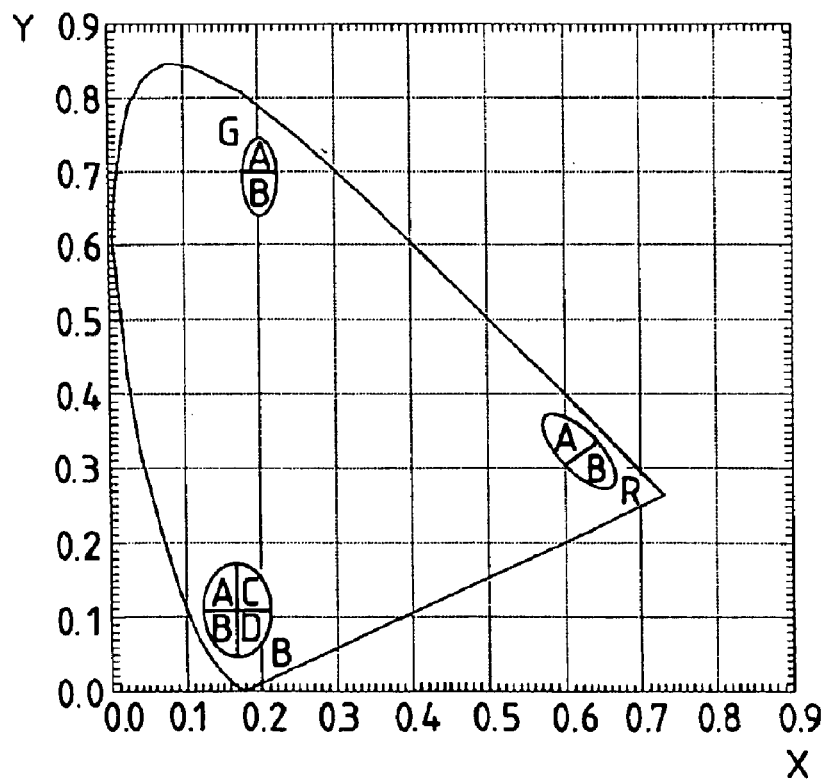
FIG. 16 is a chart showing grouping ranges in the second embodiment.
Figure 17:
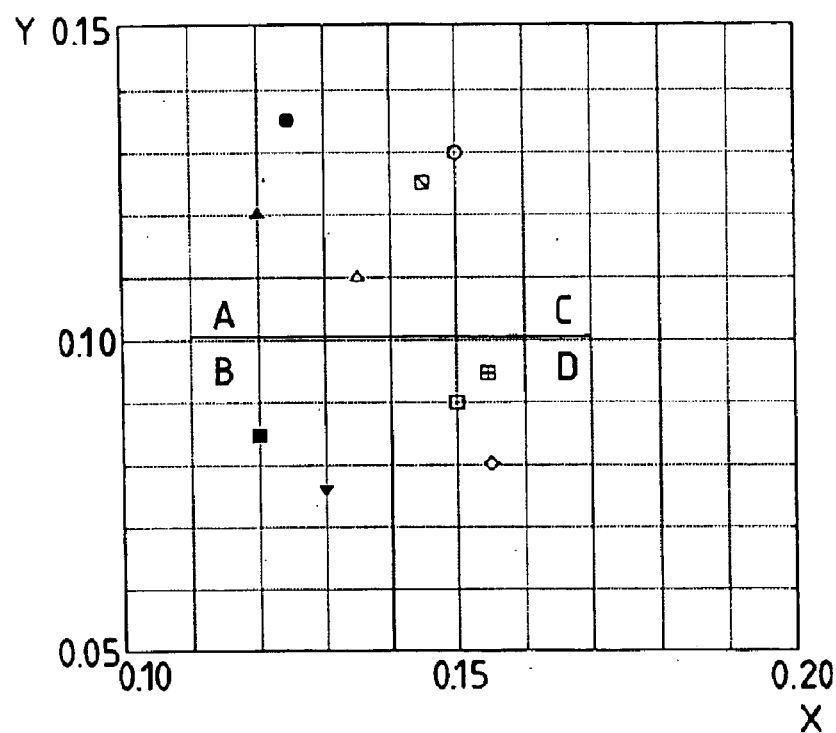
FIG. 17 is a chart showing grouping by x-y chromaticity of B sensors in the second embodiment.
Figure 18:
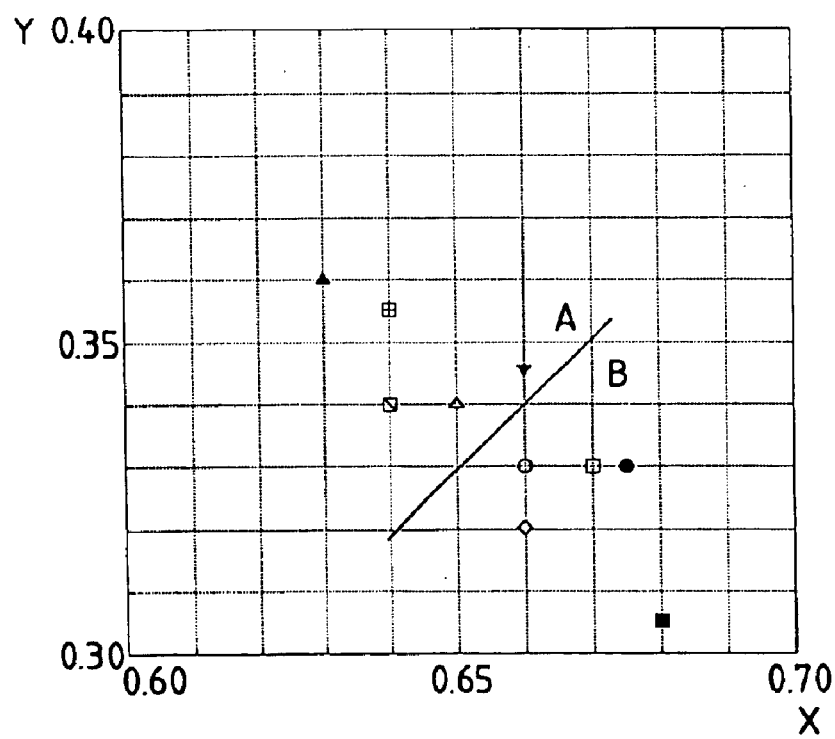
FIG. 18 is a chart showing grouping by x-y chromaticity of R sensors in the second embodiment.

FIG. 16 shows the ranges of fluctuation of the xy chromaticity of the R, G, B sensors among the sensor chips and the ranges of grouping thereof. FIG. 17 shows the distribution of xy chromaticity of the B sensors in 10 sensor chips and the grouping thereof, and FIG. 18 similarly shows the distribution of xy chromaticity of the R sensors in 10 sensor chips. By dividing the R and G sensors respectively in two groups and the B sensors into four groups, the sensor chips are classified into 16 groups of different chromaticity characteristics according to the combination of R. G and B. By constructing each sensors array from the sensor chips belonging only to a group selected from so many groups, the color spaces of the constituting sensor chips are made even closer and the color step difference can be securely reduced.

As explained in the foregoing, it is rendered possible to provide a contact multi-chip color image sensor capable of image reading with highly uniform color characteristics over the entire pixel area, by classifying the sensor chips, constituting said image sensor, into plural groups according to the similarity of the color reproducible area of each sensor chip and constructing each sensor array with the sensor chips belonging only to a group.

In the present embodiment, the grouping of the sensor chips is conducted according to the color reproducible area of such sensor chips in the CIE 1931 standard coloimetric system, but a similar grouping may be conducted in other color space such as CIELAB color space or CLELUV space. Also such concept is naturally applicable to other similar color image sensors such as of filter switching type or rotating prism type.

Figure 19:
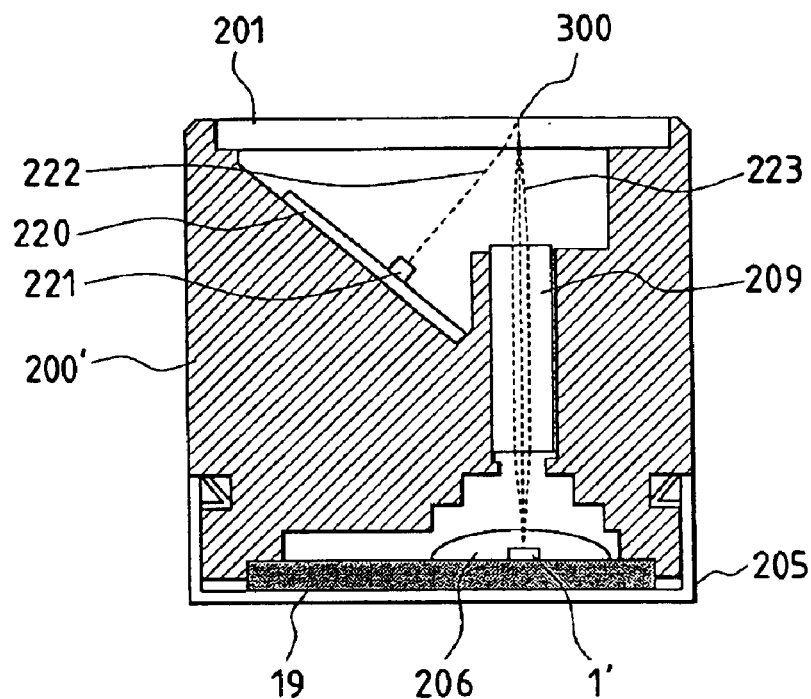
FIG. 19 is a cross-sectional view of a contact multi-chip image sensor of a third embodiment.

FIG. 19 is a cross-sectional view of a contact multi-chip color image sensor constituting a third embodiment. The foregoing second embodiment discloses an image sensor provided with color filters, but the present embodiment describes an image sensor of light source switching type.

The color image sensor of light source switching type is composed of monochromatic sensor chips without color filters and light sources of three colors, wherein the color information is obtained from the output signals of the monochromatic sensor chips when the light sources of three colors are alternately turned on in a position on the original image. The present embodiment employs LED's of R, G and B colors, but there may also be employed other colors or other light sources. In FIG. 19 there are shown a sensor array 1' consisting of an array of monochromatic sensor chips without color filters; a frame 200'; an LED 221; and an LED board 220 on which LED's are mounted.

Figure 20:
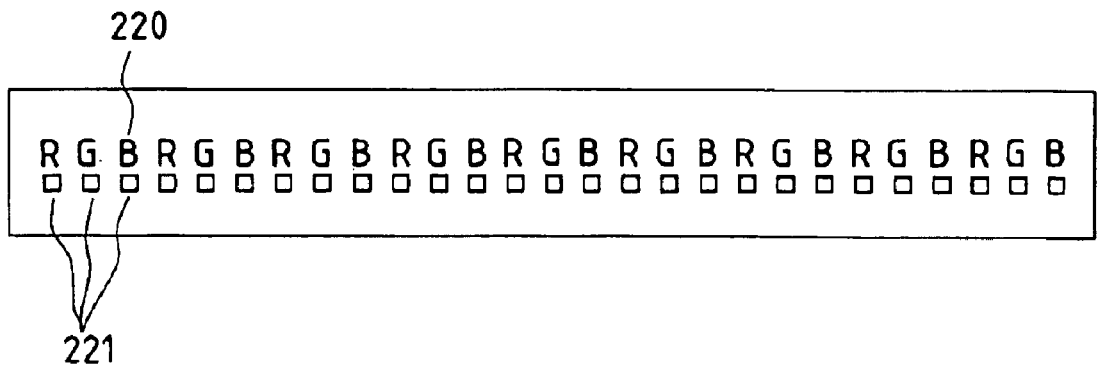
FIG. 20 is a view of an LED board in the third embodiment.
Figure 21:
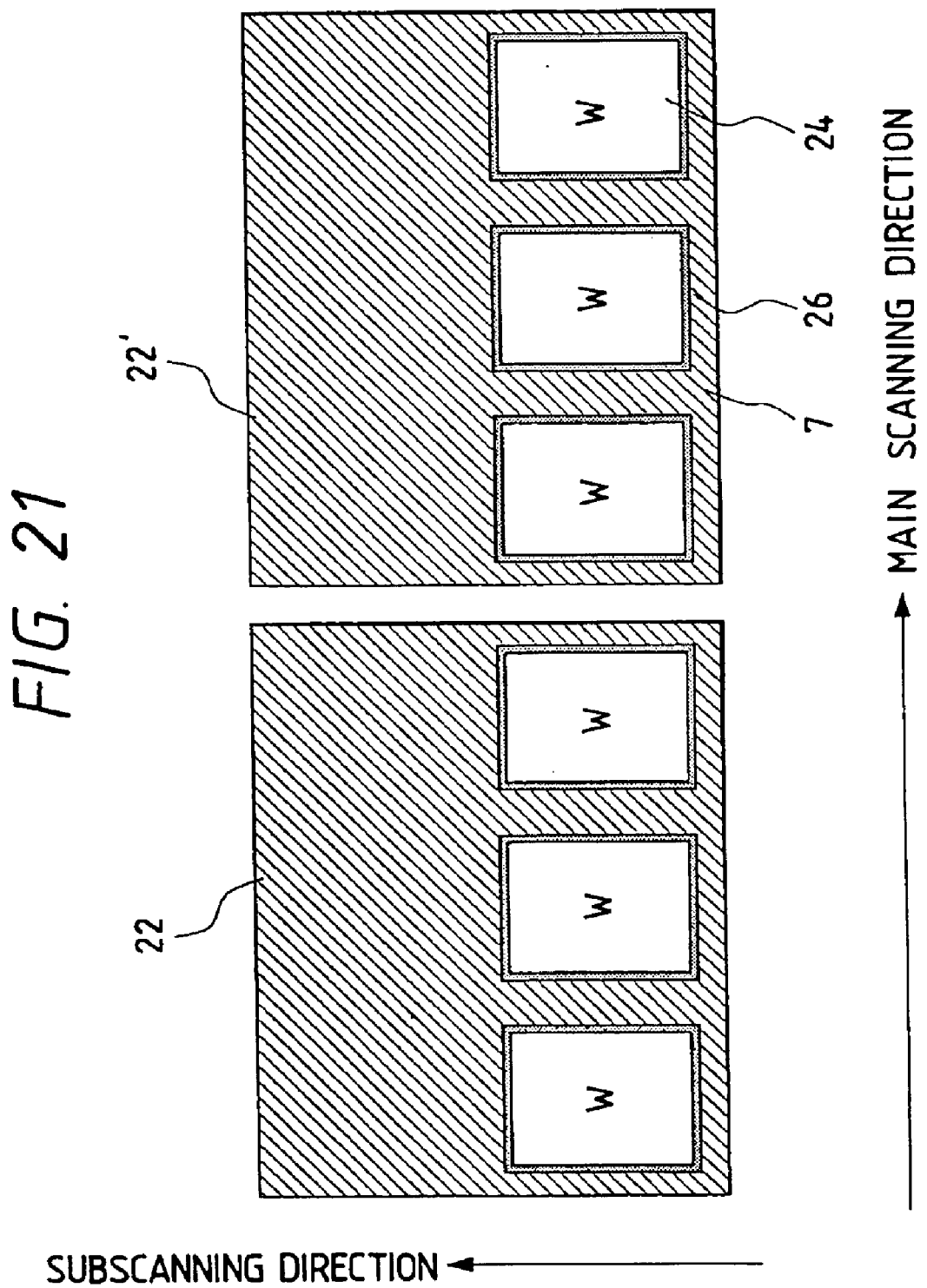
FIG. 21 is a view showing the arrangement of pixels in the sensor chips of the third embodiment.

As shown in FIG. 20, the LED's 221 consist of those 221R, 221G, 221B respectively of R, G and B colors, which are arranged in a linear array and those of each color can be independently turned on and off. The light 222 emerging from the LED's 221 illuminates a face of the original placed in contact with the upper face of a transparent glass plate 201, and the light 223 reflected from the image-bearing face of the original enters the sensor array 1', provided on a board 19, through an optical system 209. As shown in FIG. 21, the sensor array 1' is composed of sensor chips 22, 22', . . . , each of which is provided with a linear array of apertures 24 which are not provided with color filters and which are mutually separated by an element separating area 26 and light shielding areas 7.

Also in such contact multi-chip color image sensor of light switching type, the color space can be determined as in the foregoing second embodiment. For example, the tristimulus values Xg, Yg, Zg of G color can be obtained from:

$$Xg = K \int LG(\lambda)S(\lambda)x(\lambda)d\lambda$$

$$Yg = K \int LG(\lambda)S(\lambda)y(\lambda)d\lambda$$

$$Zg = K \int LG(\lambda)S(\lambda)z(\lambda)d\lambda$$

$$K = 100/\int D65(\lambda)y(\lambda)d\lambda$$

wherein

LG ($\lambda$): spectral emission characteristics of GLED;

S ($\lambda$): spectral sensitivity characteristics of a single monochromatic sensor;

D65 ($\lambda$): spectral emission characteristics of a standard D65 light source;

x, y, z ($\lambda$): color matching functions of CIE 1931 standard coloimetrick system.

Figure 22:
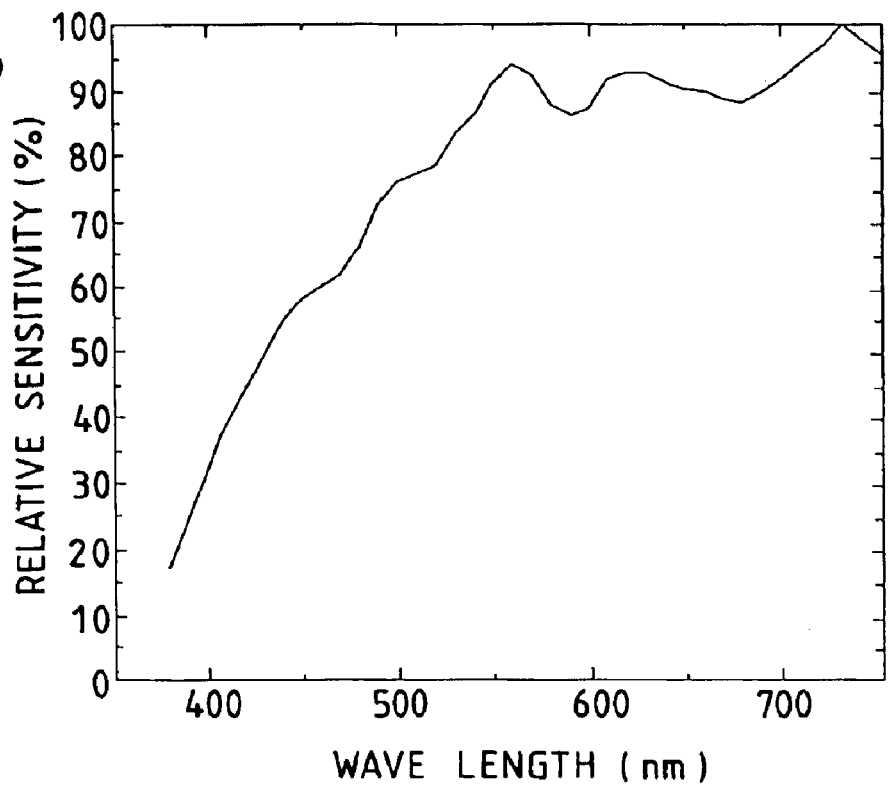
FIG. 22 is a chart showing the spectral sensitivity characteristics of sensor chip.
Figure 23:
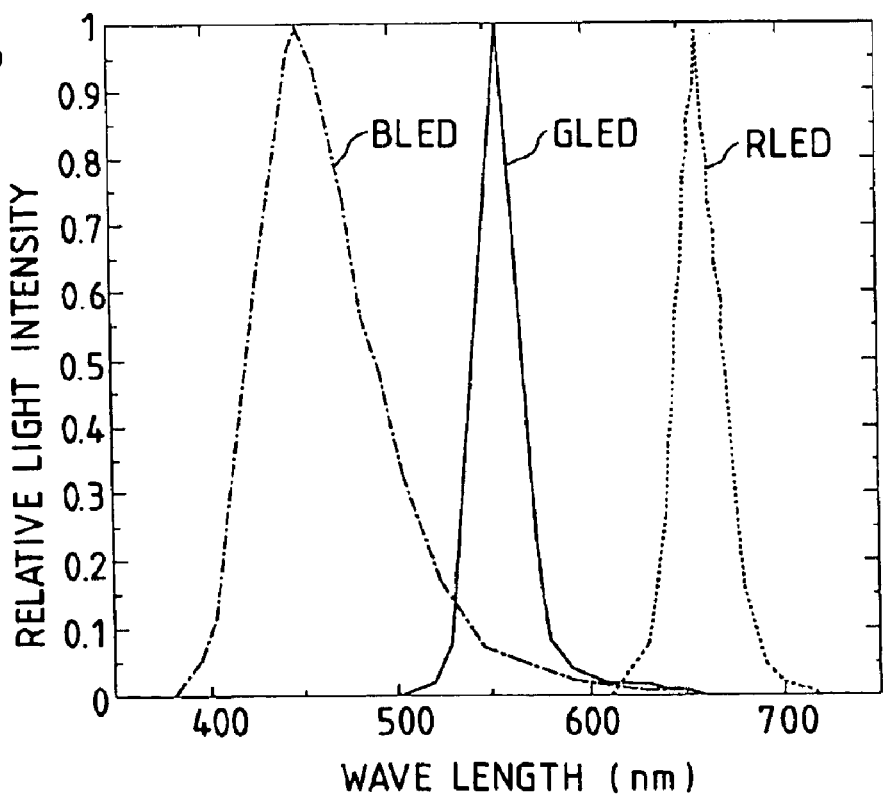
FIG. 23 is a chart showing the spectral emission characteristics of LED's of R, G, B in the third embodiment.

S ($\lambda$) and LG ($\lambda$) have characteristics as respectively shown in FIGS. 22 and 23. Also the tristimulus values Xr, Yr, Zr of R color and those Xb, Yb, Zb of B color can be similarly determined by replacing, in the foregoing equations, the spectral emission characteristics LG ($\lambda$) of the GLED with those LR ($\lambda$) of RLED and those LB ($\lambda$) of BLED.

The CIE-xy coordinates of the G color can be determined by substituting the tristrimulus values Xg, Yg, Zg, obtained from the foregoing equations, into following equations:

$$xg = Xg/(Xg+Yg+Zg)$$

$$yg = Yg/(Xg+Yg+Zg)$$

The xy coordinates xr, yr of the R color and those xb, yb of the B color can also be determined in a similar manner.

Also in the color image sensor of light source switching type, the R, G, B chromaticity coordinates, defining the color spaces, can be determined according to the above-explained procedure. Thus, by measuring the spectral sensitivity characteristics of each monochromatic sensor chip and classifying the sensor chips according to thus calculated chromaticity coordinates, it is rendered possible to construct each contact multi-chip color image sensor only with the sensor chips of similar chromaticity characteristics as in the second embodiment and to improve the quality of the read image.

It is thus rendered possible to provide a contact multi-chip color image sensor capable of image reading with highly uniform color characteristics over the entire pixel area, by classifying the sensor chips, constituting the image sensor, into plural groups according to the similarity of the color reproducible area of each sensor chip and constructing each sensor array with the sensor chips belonging only to a group.

What is claimed is:

1. An image reading apparatus comprising a plurality of sensor chips, each comprising a plurality of sensors, mounted on a single sensor board, wherein said plurality of sensor chips are sensor chips are classified in accordance with difference in color characteristics of outputted color signals among said plurality of sensor chips in groups of different color characteristics, to be mounted on the single sensor board, and wherein said plurality of sensors outputting a largest relative difference in spectral sensitivity characteristics are not arranged at mutually adjacent positions.

2. The image reading apparatus according to claim 1, wherein said plurality of sensors are composed of a plurality of different colors.

3. The image reading apparatus according to claim 1, wherein said color characteristic of color signals includes sensitivity.

4. The image reading apparatus according to claim 3, wherein said sensitivity is the sensitivity of said plurality of sensors.

5. The image reading apparatus according to claim 4, further comprising a light source for illuminating an image to be read, wherein said plurality of sensor chips are further selected from a group of sensor chips further classified according to radiation characteristics of said light source.

6. The image reading apparatus according to claim 4, further comprising a filter for limiting light incident on the plurality of sensor chips, wherein said plurality of sensor chips are further selected from a group of sensor chips further classified according to transmission characteristics of said filter.

7. The image reading apparatus according to claim 5, further comprising a filter for limiting light incident onto the plurality of sensor chips, wherein said plurality of sensor chips are further selected from a group of sensor chips further classified according to radiation characteristics of said light source and transmission characteristics of said filter.

8. The image reading apparatus according to claim 3, wherein said sensitivity includes spectral sensitivity.

9. The image reading apparatus according to claim 8, wherein the spectral sensitivity is the spectral sensitivity of said plurality of sensors.

10. The image reading apparatus according to claim 9, further comprising a light source for illuminating an image to be read, wherein said plurality of sensor chips are further selected from a group of sensor chips further classified according to spectral radiation characteristics of said light source and wherein said sensitivity is spectral sensitivity of said plurality of sensors.

11. The image reading apparatus according to claim 9, further comprising a filter for limiting light incident onto the plurality of sensor chips, wherein said plurality of sensor chips are further selected from a group of sensor chips further classified according to spectral transmission characteristics of said filter.

12. The image reading apparatus according to claim 10, further comprising a filter for limiting light incident onto the plurality of sensor chips, wherein said plurality of sensor chips are further selected from a group of sensor chips further classified according to spectrum radiation characteristics of said light source and transmission characteristics of said filter.

13. The image reading apparatus according to claim 2, wherein said color characteristic of color signals includes chromaticity.

14. The image reading apparatus according to claim 13, wherein said chromaticity is chromaticity of said plurality of sensor chips.

15. The image reading apparatus according to claim 1, wherein said plurality of sensors are red, green, and blue.

16. The image reading apparatus according to claim 1, wherein said plurality of sensor chips are monochromatic and an image of an object is picked up by switching plural light sources of different colors.

17. The image reading apparatus according to claim 16, wherein said light sources include red, green and blue.

18. The image reading apparatus according to claim 5, wherein said color characteristic of color signals include chromaticity calculated from said sensitivity of each sensor chip of said group of sensor chips.

19. The image reading apparatus according to claim 6, wherein said color characteristic of color signals include chromaticity calculated from said sensitivity of each sensor chip of said group of sensor chips.

20. The image reading apparatus according to claim 7, wherein said color characteristic of color signals include chromaticity calculated from said sensitivity of each sensor chip of said group of sensor chips.

21. The image reading apparatus according to claim 10, wherein said color characteristic of color signals include chromaticity calculated from said spectral sensitivity of each sensor chip of said group of sensor chips.

22. The image reading apparatus according to claim 11, wherein said color characteristic of color signals include chromaticity calculated from said spectral sensitivity of each sensor chip of said group of sensor chips.

23. The image reading apparatus according to claim 12, wherein said color characteristic of color signals include chromaticity calculated from said sensitivity of each sensor chip of said group of sensor chips.

* * * * *